United States Patent
Bigotto

(10) Patent No.: US 6,682,353 B2
(45) Date of Patent: Jan. 27, 2004

(54) CONNECTION ASSEMBLY FOR CONNECTING AN ELECTRIC SYSTEM OF A VEHICLE TO ELECTRIC COMPONENTS OF A SLIDING DOOR OF THE VEHICLE

(75) Inventor: Pier Carlo Bigotto, Cascine Vico Rivoli (IT)

(73) Assignee: FCI, Paris (FR)

( * ) Notice: Subject to any disclaimer, the term of this patent is extended or adjusted under 35 U.S.C. 154(b) by 0 days.

(21) Appl. No.: 10/302,511

(22) Filed: Nov. 22, 2002

(65) Prior Publication Data

US 2003/0119338 A1 Jun. 26, 2003

(51) Int. Cl.$^7$ .............................................. H01R 33/00
(52) U.S. Cl. .......................... 439/34; 439/162; 296/155
(58) Field of Search .................... 439/162, 34; 296/155

(56) References Cited

U.S. PATENT DOCUMENTS 6,161,894 A * 12/2000 Chapman .................... 296/155
6,358,073 B1 * 3/2002 Jhanson et al. ............. 439/164
6,517,365 B1 * 2/2003 Bungo et al. ................ 439/162

* cited by examiner

Primary Examiner—Tho D. Ta
(74) Attorney, Agent, or Firm—Perman & Green, LLP

(57) ABSTRACT

There is described a connection assembly for connecting an electric system of a vehicle to at least one electric component of a sliding door of the vehicle connected by at least one articulated arm to a carriage running along a relative longitudinal rail integral with the body of the vehicle. The connection assembly has at least one flexible flat cable having a first end connected to the electric component of the door, and a second end connected to the electric system of the vehicle; guide means of variable configuration, for guiding a first portion of the cable along the articulated arm, and for adapting the configuration of the first portion to movements of the articulated arm; and housing means for neatly gathering and dispensing a second portion of the cable as the carriage moves along the rail.

15 Claims, 4 Drawing Sheets

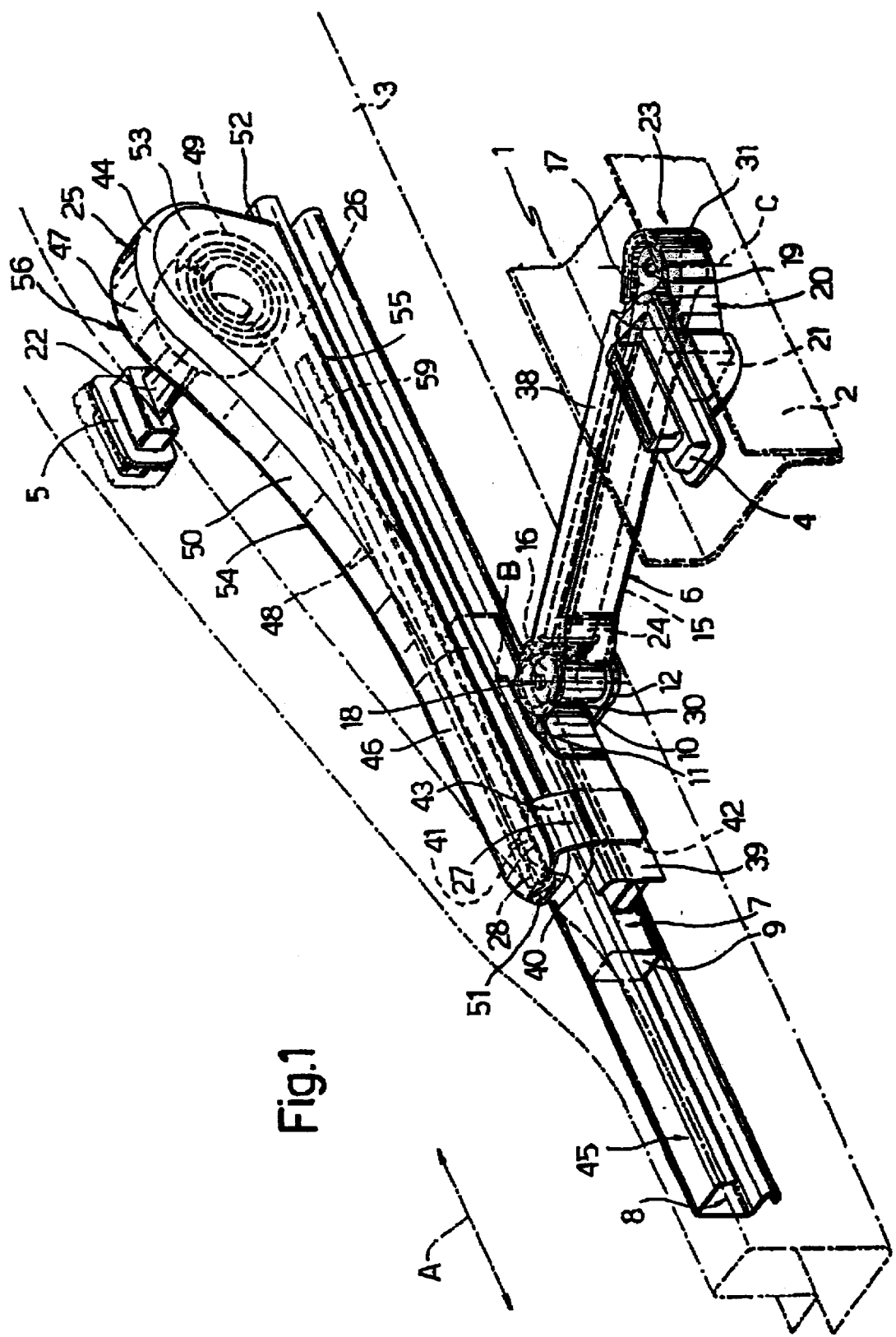

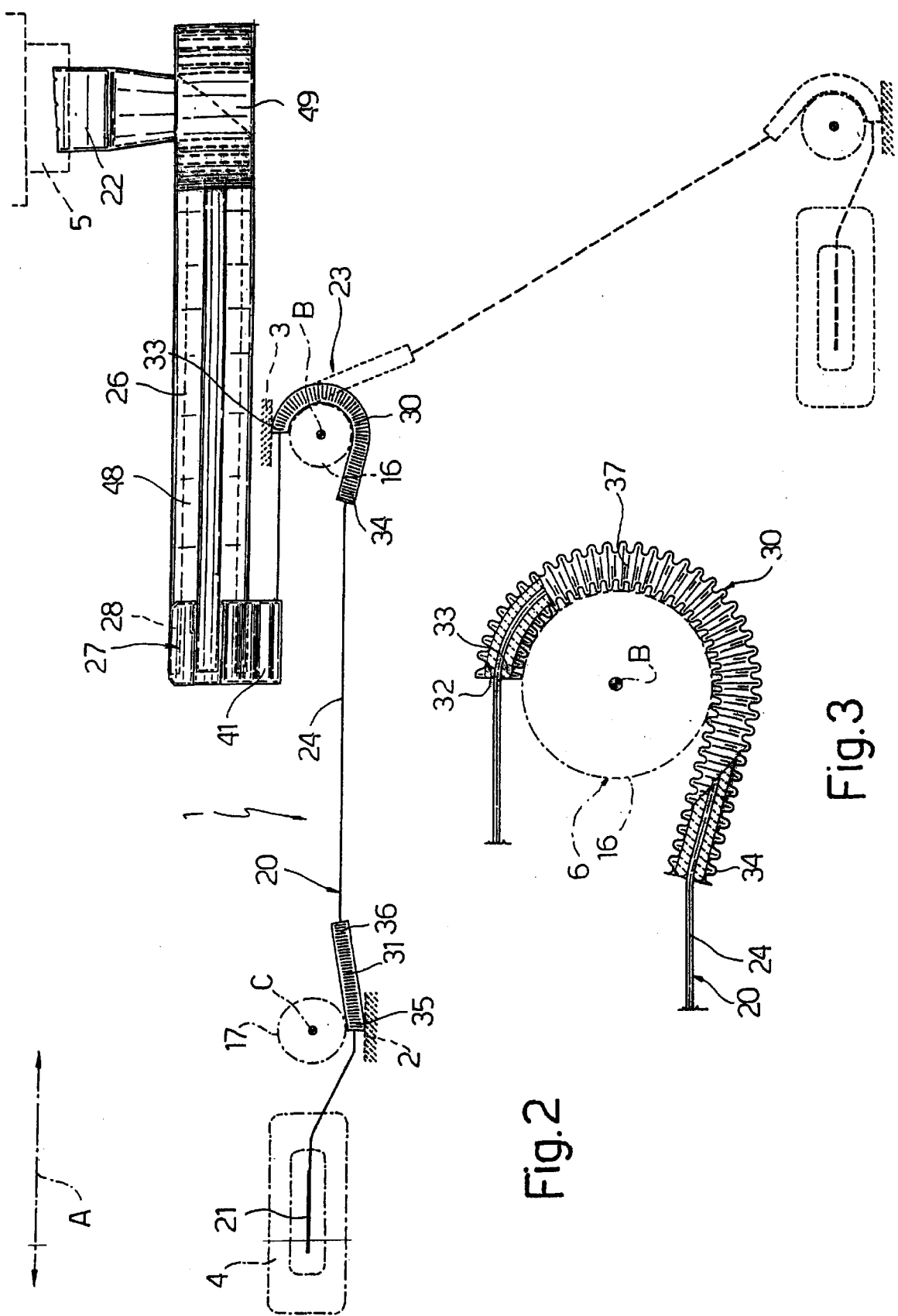

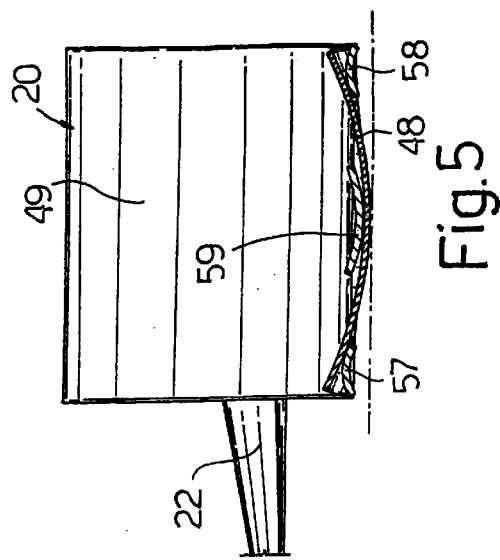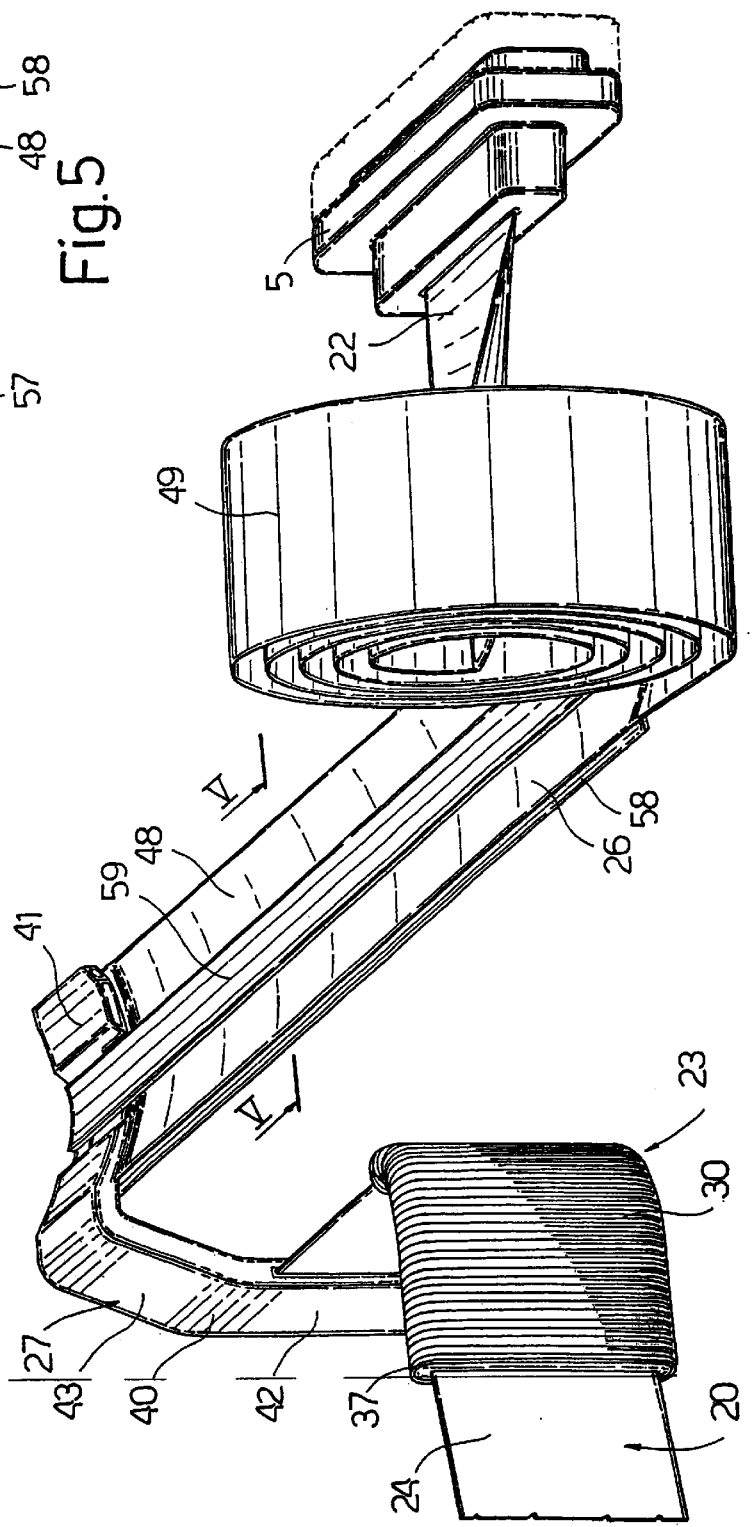

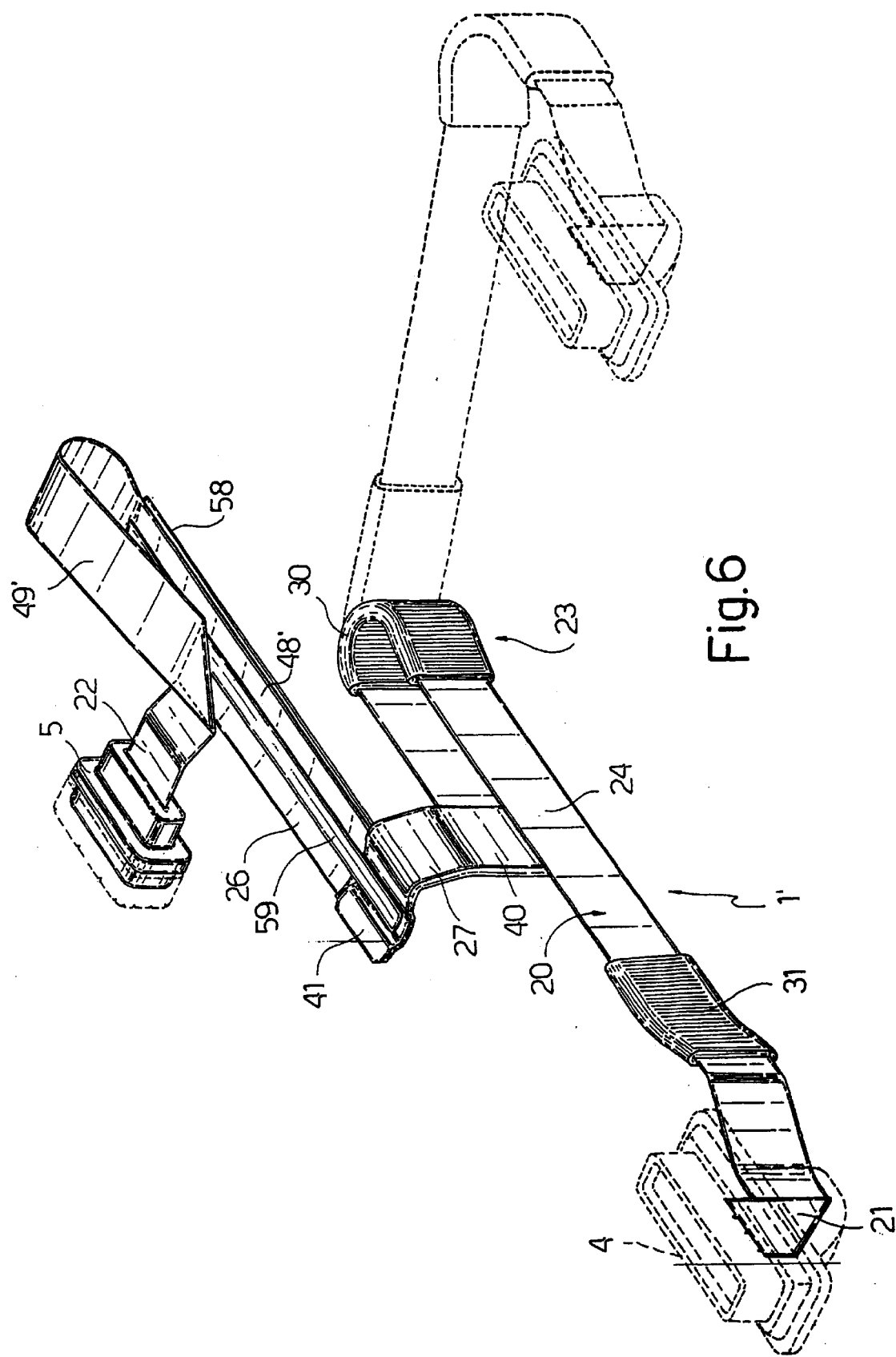

CONNECTION ASSEMBLY FOR CONNECTING AN ELECTRIC SYSTEM OF A VEHICLE TO ELECTRIC COMPONENTS OF A SLIDING DOOR OF THE VEHICLE

BACKGROUND

1. Field of the Invention

The present invention relates to a connection assembly for connecting an electric system of a vehicle to electric components of a sliding door of the vehicle.

Vehicles are known featuring sliding doors, i.e. doors connected at the top and bottom by articulated arms to respective carriages running inside respective longitudinal rails fixed to the door frame.

Doors of this sort are opened in a compound movement comprising rotation outwards of the vehicle to detach the door from the frame, and translation along the rails in a direction parallel to the traveling direction of the vehicle.

Such an opening movement poses problems in connecting the electric components on the sliding door to the vehicle electric system, on account of the distance between the electric connecting points on the vehicle body and the corresponding electric connecting points on the door varying when opening and closing the door.

2. Brief Description of Related Developments

At present, the above connection is made in two ways:

A first employs male electric contacts on the door; and female electric contacts on the door frame, which mate with the male electric contacts when the door is closed. This solution has various drawbacks. In particular, when the door is open, the electric components on the door are disconnected from the vehicle electric system and therefor cannot be activated. Moreover, repeated connection/disconnection of the contacts eventually results in wear of the contacts and therefore in unreliability or failure of the relative electric connection. And finally, such a solution is user-hazardous, by parts of the user's body possibly being interposed accidentally between, and so connecting, the male and female contacts when the door is open.

The second way is to employ conducting tracks fixed to the vehicle body; and brush contacts fitted to the door and cooperating with the tracks, so that the electric system of the vehicle is connected to the electric components on the door in any operating position of the door. On account of the way it operates, however, a sliding connection of this sort is exposed to external agents, such as dust, which may cause microinterruptions of the electric signals.

SUMMARY OF THE INVENTION

It is an object of the present invention to provide a connection assembly for connecting an electric system of a vehicle to electric components of a sliding door of the vehicle, designed to eliminate, in a straightforward, reliable manner, the aforementioned drawbacks typically associated with known connection assemblies.

According to the present invention, there is provided a connection assembly for connecting an electric system of a vehicle to at least one electric component of a sliding door of the vehicle; said door being connected by at least one articulated arm to a carriage running along a relative longitudinal rail integral with the body of said vehicle; and said connection assembly being characterized by comprising:

at least one flexible flat cable having a number of side by side conducting tracks, a first end connected to said electric component of said door, and a second end connected to the electric system of the vehicle;

guide means of variable configuration, for guiding a first portion of said cable along said articulated arm, and for adapting the configuration of said first portion to movements of the articulated arm; and housing means for neatly gathering and dispensing a second portion of said cable as said carriage moves along said rail.

BRIEF DESCRIPTION OF THE DRAWINGS

A preferred, non-limiting embodiment of the present invention will be described by way of example with reference to the accompanying drawings, in which:

FIG. 1 shows a view in perspective of a connection assembly, in accordance with the present invention, for connecting an electric system of a vehicle to electric components of a sliding door of the vehicle;

FIG. 2 shows a top plan view, with parts removed for clarity, of the FIG. 1 connection assembly in two different operating positions;

FIG. 3 shows a larger-scale top plan view of a detail of the FIG. 2 connection assembly;

FIG. 4 shows a larger-scale view in perspective of part of the FIG. 1 connection assembly;

FIG. 5 shows a section along line V—V in FIG. 4;

FIG. 6 shows a view in perspective of a variation of the FIG. 1 connection assembly in two different operating positions.

DETAILED DESCRIPTION OF THE PREFERRED EMBODIMENT(S)

With reference to FIGS. 1 and 2, number 1 indicates as a whole a connection assembly for connecting an electric system (not shown) of a vehicle (shown partly) to electric components of a sliding door 2 of the vehicle.

The vehicle and door 2 are only illustrated as required for a clear understanding of the present invention. More specifically, the dot-and-dash lines in FIG. 1 indicate a bottom lateral portion of a body 3 of the vehicle, and a bottom portion of door 2. It should be pointed out that, in the following description and accompanying Claims, the term "body" is used to indicate the vehicle structure or, more strictly speaking, the "body" in the case of a car, and the "frame" in the case of commercial and industrial vehicles.

More specifically, connection assembly 1 connects a connector 4—fitted to door 2 and connectable to electric components on the door, such as the power window device and lock control actuators (not shown)—to a connector 5 fitted to vehicle body 3 and in turn connectable to the electric system.

Connectors 4 and 5 are commonly referred to as "door node" and "body node" respectively.

With reference to FIG. 1, door 2 is connected at the bottom, by at least one articulated arm 6, to a carriage 7 mounted to run along a longitudinal rail 8 fixed to vehicle body 3. The top connection of door 2 to vehicle body 3 is identical, but, not being necessary for a clear understanding of the present invention, is not shown or described.

As shown in FIG. 1, rail 8 extends in a direction A parallel to the traveling direction of the vehicle, and has a C-shaped cross section with its concavity facing outwards of the vehicle.

Carriage 7 substantially comprises a main portion 9 complementary in shape to rail 8 and sliding inside the rail;

and a substantially fork-shaped connecting appendix 10 projecting from main portion 9 to receive arm 6. More specifically, appendix 10 comprises an end wall 11 fixed to main portion 9 of carriage 7; and two flanges 12 projecting perpendicularly from end wall 11, and having respective through holes coaxial with a vertical axis B perpendicular to flanges 12 and to direction A.

As shown in FIG. 2, arm 6 comprises a straight, rectangular-section main portion 15; and opposite hollow cylindrical end portions 16, 17, one (16) of which is inserted between and hinged to flanges 12 of appendix 10 by a pin 18 of axis B, and the other (17) of which is hinged to the frame of door 2 by a pin 19 of axis C parallel to axis B.

Arm 6 rotates about axis B between a collapsed position—corresponding to a closed position of door 2, and in which it collapses towards vehicle body 3 and carriage 7—and an extended position (FIG. 1)—in which it forms a roughly 120° angle with main portion 9 of carriage 7, and defines a fully laterally detached position of door 2 with respect to vehicle body 3.

Door 2 is moved from the closed to a fully-open position by rotating arm 6 about axis B and sliding carriage 7 along rail 8. More specifically, carriage 7 is movable along rail 8, in the opposite direction to the traveling direction of the vehicle, between a forward position (FIG. 1)—in which door 2 can be moved into the closed position by rotating arm 6 into the collapsed position—and a withdrawn position (not shown) corresponding to the fully-open position of door 2.

With reference to FIGS. 1, 2 and 4, connection assembly 1 comprises at least one flexible flat cable 20 having opposite ends 21, 22 connected to respective connectors 4, 5; guide means 23 of variable configuration, for guiding a portion 24 of cable 20 along arm 6, and for adapting the configuration of portion 24 to rotation of arm 6 about axis B; and housing means 25 for neatly gathering and dispensing a portion 26 of cable 20 as carriage 7 moves along rail 8. Connection assembly 1 also comprises a fastening member 27 for fixing a portion 28 of cable 20, interposed between portions 24 and 26, to main portion 9 of carriage 7.

Cable 20 is defined in known manner by a strip of insulating material, on which a number of parallel conducting tracks (not shown) are applied longitudinally and in turn covered with a further layer of insulating material; and each track is located a given distance, and so electrically insulated, from the adjacent track.

Guide means 23 comprise two flexible sheaths 30, 31 located at end portions 16, 17 of arm 6, and through which portion 24 of cable 20 extends. More specifically, as shown in FIGS. 2, 3 and 4, each sheath 30, 31 is flat, and defines a through cavity 32 through which portion 24 of cable 20 extends loosely.

Sheath 30 extends about part of the cylindrical peripheral surface of end portion 16 of arm 6, and has opposite end portions 33, 34 fixed to vehicle body 3 and arm 6 respectively. Similarly, sheath 31 extends about part of the cylindrical peripheral surface of end portion 17 of arm 6, and has opposite end portions 35, 36 fixed to the frame of door 2 and to arm 6 respectively.

Each sheath 30, 31 has a bellows-type lateral wall 37 enabling it to adapt to the position of arm 6, i.e. to stretch or contract locally, depending on the configuration imposed by arm 6 on portion 24 of cable 20. Variations in the configuration of sheaths 30, 31 result in longitudinal slide of the sheaths with respect to portion 24 of cable 20. So, to limit the negative effects of sheaths 30, 31 rubbing against cable 20 as arm 6 rotates, each sheath 30, 31 is preferably provided with one or more felt liners (not shown) which interact with cable 20.

The portion of cable 20 between sheaths 30 and 31 extends parallel to main portion 15 of arm 6, on the opposite side of main portion 15 to that facing vehicle body 3 in the closed position of door 2, and is covered with a protective shell 38 fixed to main portion 15 of arm 6.

From end portion 35 of sheath 31, opposite end portion 36 facing sheath 30, a portion of cable 20, folded 90°, projects and defines end 21 connected to connector 4.

The portion of cable 20 between sheath 30 and fastening member 27 extends parallel to rail 8, between main portion 9 of carriage 7 and a guard wall 39 fixed to and projecting from main portion 9.

Fastening member 27 is defined by a flat, hollow, substantially upside-down-L-shaped shell comprising a first portion 40 fixed in known manner (not shown) to main portion 9 of carriage 7, on the opposite side to that engaged inside rail 8; and a second portion 41 substantially perpendicular to portion 40 and extending over the top of rail 8. More specifically, portion 40 of fastening member 27 comprises a bottom portion 42 extending between wall 39 and main portion 9 of carriage 7; and a top portion 43 projecting from wall 39 and connected to portion 40.

Cable 20 is inserted laterally inside bottom portion 42 of fastening member 27, and comes out of portion 41 on the same side, so that cable 20 is folded 90° once at portion 40 of fastening member 27, and a second time at portion 41 of fastening member 27.

Portion 26 of cable 20 coming out of portion 41 of fastening member 27 is housed inside a contoured casing 44 preferably fixed to a top surface 45 of rail 8 and defining housing means 25.

More specifically, casing 44 is prismatic in shape, is slightly wider than cable 20, and comprises a substantially parallelepiped-shaped portion 46 flattened towards top surface 45 of rail 8; and an upwardly-convex portion 47 connected on one side to portion 46. As shown in FIG. 1, the flattened parallelepiped-shaped portion 46 houses a straight portion 48, extending parallel to top surface 45 of rail 8, of portion 26 of cable 20, while convex portion 47 houses a folded portion—in the example shown, a coiled portion—49 of portion 26 of cable 20.

Casing 44 is defined by a contoured wall 50 facing top surface 45 of rail 8 and contacting surface 45 at opposite end edges 51, 52; and by two facing lateral cover walls 53, 54 extending between rail 8 and opposite lateral edges of contoured wall 50. More specifically, lateral wall 53 faces arm 6, and has a longitudinal through opening 55 elongated in the extension direction A of rail 8 and engaged in sliding manner by portion 41 of fastening member 27. Opening 55 is long enough in direction A to allow carriage 7, together with fastening member 27, to move between the withdrawn and forward positions. More specifically, the opposite ends of opening 55 indicate in FIG. 1 the stop, positions of carriage 7.

At convex portion 47, lateral wall 54 has a through opening 56 through which end 22 of cable 20 comes out of casing 44 for connection to connector 5. More specifically, end 22 projects laterally from the center of the coil formed by folded portion 49 of cable 20, and is in turn folded 90° with respect to portion 49.

As carriage 7 moves from the forward to the withdrawn position along rail 8, connector 4 moves with door 2 in direction A towards connector 5 fitted to vehicle body 3, and the surplus portion of cable 20 inside casing 44 winds about the envelope already formed in convex portion 47 of casing 44. Conversely, as carriage 7 moves from the withdrawn to the forward position along rail 8, the envelope formed in convex portion 47 of casing 44 is at least partly unwound.

To increase the rigidity of portion 26 of cable 20 inside casing 44, and so prevent jamming or undesired movement of cable 20 when carriage 7 is moving, parallelepiped-shaped portion 46 and part of convex portion 47 are provided inside with a number of positioning and guide bars 57, 58, 59 for keeping straight portion 48 of portion 26 of cable 20 slightly concave on the side facing folded portion 49.

Bars 57, 58, 59 are supported in known manner (not shown) by casing 44, and extend parallel to direction A. As shown in detail in FIGS. 4 and 5, two of the bars (57, 58) define respective lateral supports for lateral strips of straight portion 48 of portion 26 of cable 20, and a third bar (59) cooperates on the opposite side with an intermediate strip of straight portion 48, so that bars 57, 58, 59 define an arc-shaped seat engaging portion 48 of cable 20.

Bars 57, 58, 59 are preferably convex on the side facing the straight portion 48 of cable 20 with which they interact.

Portion 41 of fastening member 27 is advantageously engaged in sliding manner between bars 57, 58 and 59.

In actual use, as door 2 is opened, arm 6 rotates about axis B from the collapsed to the extended position, and carriage 7 moves from the forward to the withdrawn position along rail 8.

Rotation of arm 6 about axis B produces a variation in the configuration of sheaths 30, 31 at end portions 16, 17 of arm 6, and, consequently, in the fold of portion 24 of cable 20. More specifically, as shown in FIG. 2, sheath 30 passes from a substantially C-shaped to a predominantly straight configuration (as shown by the dash line), while sheath 31 passes from a substantially straight to a substantially L-shaped configuration (as shown by the dash line). During the above variations, lateral wall 37 of each sheath 30, 31 expands and contracts locally, and sheath 30, 31 slides with respect to cable 20, so that sheaths 30, 31 provide for guiding the fold of cable 20 produced by the variation in the position of arm 6, and so enable cable 20 to pass from one configuration to the other with no sharp bends or anomalous stress.

As carriage 7 moves from the forward to the withdrawn position along rail 8, portion 41 of fastening member 27 moves accordingly along opening 55 and, between bars 57, 58, and 59, and, as explained above, part of portion 26 of cable 20 winds about the envelope already formed in convex portion 47 of casing 44. Conversely, as carriage 7 moves in the opposite direction along rail 8, part of the envelope formed by portion 26 of cable 20 in convex portion 47 of casing 44 is unwound.

The FIG. 6 variation relates to a connection assembly 1' similar to connection assembly 1, and the component parts of which are indicated, where possible, using the same reference numbers as for the corresponding parts of connection assembly 1.

More specifically, connection assembly 1' differs from connection assembly 1 by portion 26 of cable 20 being simply folded into a U inside casing 44. In which case, portion 26 of cable 20 comprises a straight portion 48' identical with portion 48 and supported in the same way by bars 57, 58, 59; and a portion 49' which is housed inside convex portion 47 of casing 44, but which, unlike portion 49, is simply folded into a U over portion 48'. The movement of carriage 7 along rail 8 simply produces a variation in the curve of portion 49' folded over portion 48'; and the size of convex portion 47 of casing 44 defines the maximum curve of the fold in portion 49'.

The advantages of connection assemblies 1, 1' according to the present invention will be clear from the foregoing description.

In particular, connection assemblies 1, 1' provide for permanently connecting the electric system on the vehicle to the electric components on door 2, regardless of whether door 2 is open or closed.

Moreover, using a flexible flat cable for the connection safeguards the quality of the connection against external agents.

Clearly, changes may be made to connection assemblies 1, 1' without, however, departing from the scope of the present invention.

In particular, connection assemblies 1, 1' may comprise a number of superimposed flat cables.

What is claimed is:

1. A connection assembly for connecting an electric system of a vehicle to at least one electric component of a sliding door of the vehicle; said door being connected by at least one articulated arm to a carriage running along a relative longitudinal rail integral with the body of said vehicle; and said connection assembly being characterized by comprising:

at least one flexible flat cable having a number of side by side conducting tracks, a first end connected to said electric component of said door, and a second end connected to the electric system of the vehicle;

guide means of variable configuration, for guiding a first portion of said cable along said articulated arm, and for adapting the configuration of said first portion to movements of the articulated arm; and housing means for neatly gathering and dispensing a second portion of said cable as said carriage moves along said rail.

2. An assembly for connecting an electric system of a vehicle to at least one electric component of a sliding door of the vehicle; said door being connected by at least one articulated arm to a carriage running along a relative longitudinal rail integral with the body of said vehicle; and said connection assembly being characterized by comprising:

at least one flexible flat cable having a number of side by side conducting tracks, a first end connected to said electric component of said door, and a second end connected to the electric system of the vehicle;

guide means of variable configuration, for guiding a first portion of said cable along said articulated arm, and for adapting the configuration of said first portion to movements of the articulated arm; and housing means for neatly gathering and dispensing a second portion of said cable as said carriage moves along said rail, characterized by comprising fastening means for fixing a third portion, interposed between said first and said second portion, of said cable to said carriage.

3. An assembly for connecting an electric system of a vehicle to at least one electric component of a sliding door of the vehicle; said door being connected by at least one articulated arm to a carriage running along a relative longitudinal rail integral with the body of said vehicle; and said connection assembly being characterized by comprising:

at least one flexible flat cable having a number of side by side conducting tracks, a first end connected to said electric component of said door, and a second end connected to the electric system of the vehicle;

guide means of variable configuration, for guiding a first portion of said cable along said articulated arm, and for adapting the configuration of said first portion to movements of the articulated arm; and housing means for neatly gathering and dispensing a second portion of said cable as said carriage moves along said rail, characterized in that said guide means comprise flexible sheath members, which are of variable extension, are fitted through with said first portion of said cable, and are located at hinge section of said articulated arm.

4. An assembly as claimed in claim 3, characterized in that said sheath members extend about respective end portions of said articulated arm hinged to said carriage and said door respectively.

5. An assembly as claimed in claim 4, characterized in that each said sheath member comprises a bellows-type lateral wall, and defines a through cavity engaged by said first portion of said cable.

6. An assembly as claimed in claim 4, characterized in that a first of said sheath members has opposite end portions fixed to the body of the vehicle and to said articulated arm respectively; and a second of said sheath members has opposite end portions fixed to said door and to said articulated arm respectively.

7. An assembly for connecting an electric system of a vehicle to at least one electric component of a sliding door of the vehicle; said door being connected by at least one articulated arm to a carriage running along a relative longitudinal rail integral with the body of said vehicle; and said connection assembly being characterized by comprising:

at least one flexible flat cable having a number of side by side conducting tracks, a first end connected to said electric component of said door, and a second end connected to the electric system of the vehicle;

guide means of variable configuration, for guiding a first portion of said cable along said articulated arm, and for adapting the configuration of said first portion to movements of the articulated arm; and housing means for neatly gathering and dispensing a second portion of said cable as said carriage moves along said rail, characterized in that said second portion of said cable comprises a straight first part adjacent to said first portion of the cable, and a second part folded over said first part of said second portion of said cable; and in that said housing means comprise a housing for at least said second part of said second portion of said cable.

8. An assembly as claimed in claim 7, characterized in that said second part of said second portion of said cable is coiled.

9. An assembly as claimed in claim 7, characterized in that said second part of said second portion of said cable is folded into a U over said first part of said second portion of said cable.

10. An assembly as claimed in claim 7, characterized in that said second end of said cable is connected to an electric connector fitted to the body of said vehicle and in turn connected to the electric system of the vehicle; and in that said housing is so sized as to accumulate surplus portions of said cable as said carriage moves along said rail in such a manner as to move said electric component towards said electric connector of the vehicle.

11. An assembly as claimed in claim 7, characterized by comprising positioning and guide means for imparting a slightly concave shape to said first part of said second portion of said cable.

12. An assembly as claimed in claim 11, characterized in that said positioning and guide means define a seat in which a portion of said fastening member slides.

13. An assembly as claimed in claim 11, characterized in that said positioning and guide means comprise a number of bars parallel to one another and to the traveling direction (A) of said carriage, and defining an arc-shaped seat engaged by said first part of said second portion of said cable.

14. An assembly as claimed in claim 13, characterized in that two of said bars define respective lateral supports for lateral strips of said first part of said second portion of said cable, and another of said bars cooperates on the opposite side with an intermediate strip of said first part of said second portion of said cable.

15. An assembly as claimed in claim 13, characterized in that said bars are convex on the side facing said first part of said second portion of said cable.

* * * * *

UNITED STATES PATENT AND TRADEMARK OFFICE
CERTIFICATE OF CORRECTION

PATENT NO. : 6,682,353 B2
DATED : January 27, 2004
INVENTOR(S) : Bigotto

It is certified that error appears in the above-identified patent and that said Letters Patent is hereby corrected as shown below:

<u>Title page,</u>
Insert Item:

-- [30]  Foreign Application Priority Data

11/23/01        (IT)        01/01100 --

Signed and Sealed this

Twenty-ninth Day of June, 2004

JON W. DUDAS
*Acting Director of the United States Patent and Trademark Office*